United States Patent
Park

(10) Patent No.: US 8,290,335 B2
(45) Date of Patent: Oct. 16, 2012

(54) METHOD AND APPARATUS FOR RECORDING TRANSPORT STREAM

(75) Inventor: Jin-Man Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 898 days.

(21) Appl. No.: 12/164,157

(22) Filed: Jun. 30, 2008

(65) Prior Publication Data

US 2009/0016697 A1 Jan. 15, 2009

(30) Foreign Application Priority Data

Jul. 13, 2007 (KR) ........................ 10-2007-0070844

(51) Int. Cl.
*H04N 5/932* (2006.01)
(52) U.S. Cl. ........................ 386/220; 386/219
(58) Field of Classification Search .................. 386/124, 386/220, 219
See application file for complete search history.

(56) References Cited

U.S. PATENT DOCUMENTS

| | | | | |
|---|---|---|---|---|
| 5,619,337 A | * | 4/1997 | Naimpally | 386/329 |
| 6,819,865 B2 | * | 11/2004 | Ando et al. | 386/241 |
| 6,879,773 B2 | * | 4/2005 | Ando et al. | 386/241 |
| 6,950,604 B1 | * | 9/2005 | Kato et al. | 386/211 |
| 7,068,919 B2 | * | 6/2006 | Ando et al. | 386/211 |
| 7,313,315 B2 | * | 12/2007 | Morris et al. | 386/330 |
| 7,840,118 B2 | * | 11/2010 | Kikuchi et al. | 386/241 |
| 2001/0026561 A1 | * | 10/2001 | Morris et al. | 370/487 |
| 2007/0211718 A1 | * | 9/2007 | Kang et al. | 370/389 |

FOREIGN PATENT DOCUMENTS

| | | |
|---|---|---|
| JP | 2002197808 A | 7/2002 |
| JP | 2003091936 A | 3/2003 |
| JP | 2006245744 A | 9/2006 |
| KR | 1020030091396 A | 3/2003 |

\* cited by examiner

*Primary Examiner* — Jung Kim
*Assistant Examiner* — Shan Elahi
(74) *Attorney, Agent, or Firm* — Sughrue Mion, PLLC

(57) ABSTRACT

Provided are method and apparatus for recording transport stream. Apparatus for recording transport stream includes a packet identifier (PID)-generating module which generates a PID for a packetized elementary stream (PES) packet; a management module which transmits the PES packet to be stored in a predetermined recording medium depending on whether there has been any change in the PID; a controller module which determines whether to record a first reference frame or a second reference frame of a video frame of the PES packet; and a packet-recording module which resets an initial recording location in the predetermined recording medium based on a result of the determination.

10 Claims, 5 Drawing Sheets

FIG. 2

BUFFER (200)

| | |
|---|---|
| RECORDING-LOCATION INFO 1 | PID 1 |
| RECORDING-LOCATION INFO 2 | PID 1 |
| RECORDING-LOCATION INFO 3 | PID 1 |
| RECORDING-LOCATION INFO 4 | PID 2 |
| RECORDING-LOCATION INFO 5 | PID 2 |
| RECORDING-LOCATION INFO 6 | PID 2 |
| RECORDING-LOCATION INFO 7 | PID 3 |
| RECORDING-LOCATION INFO 8 | PID 3 |
| RECORDING-LOCATION INFO 9 | PID 3 |
| RECORDING-LOCATION INFO 10 | PID 4 |
| RECORDING-LOCATION INFO 11 | PID 4 |
| RECORDING-LOCATION INFO 12 | PID 4 |
| RECORDING-LOCATION INFO 13 | PID 5 |
| ⋮ | ⋮ |

FIG. 3

FIRST TABLE (300)

| | |
|---|---|
| RECORDING-LOCATION INFO 1 | PID 1 |
| RECORDING-LOCATION INFO 4 | PID 2 |
| RECORDING-LOCATION INFO 7 | PID 3 |
| RECORDING-LOCATION INFO 10 | PID 4 |
| RECORDING-LOCATION INFO 13 | PID 5 |
| RECORDING-LOCATION INFO 16 | PID 6 |
| RECORDING-LOCATION INFO 20 | PID 7 |
| RECORDING-LOCATION INFO 23 | PID 8 |
| RECORDING-LOCATION INFO 27 | PID 9 |
| RECORDING-LOCATION INFO 30 | PID 10 |
| ⋮ | ⋮ |

FIG. 4

SECOND TABLE (400)

| RECORDING-LOCATION INFO 10 | PID 4 |
|---|---|
| RECORDING-LOCATION INFO 30 | PID 10 |

FIG. 5

THIRD TABLE (500)

| REFERENCE FRAME_1 | - | PID_1 |
|---|---|---|
| REFERENCE FRAME_3 | RECORDING INFO | PID_4 |
| REFERENCE FRAME_4 | RECORDING INFO | PID_10 |

METHOD AND APPARATUS FOR RECORDING TRANSPORT STREAM

CROSS-REFERENCE TO RELATED APPLICATION

This application claims priority from Korean Patent Application No. 10-2007-0070844 filed on Jul. 13, 2007 in the Korean Intellectual Property Office, the disclosure of which is incorporated herein by reference in its entirety.

BACKGROUND OF THE INVENTION

1. Field of the Invention

Apparatuses and methods consistent with the present invention relate to recording a transport stream, and more particularly, to selectively recording a transport stream using an apparatus that records and regenerates the received transport stream.

2. Description of the Related Art

Currently existing digital television (DTV) broadcasts include digital satellite broadcasts, terrestrial wireless digital broadcasts, and cable digital broadcasts.

Although the mediums used for broadcasting such digital broadcasts are different, video and music compression, and packet structure and transmission format are similar.

Digital broadcasting uses the Moving Picture Experts Group 2 (MPEG-2) Transport Stream (TS) standard defined by the ISO/IEC 13818-1 as a basic transmission standard.

Transport streams typically include video packets, audio packets, program specific information, and packets having various associated information. Each packet includes a header and elementary stream (ES). The ES generally includes picture-layer data includes a picture header and video data.

Accordingly, the picture-layer data can be appropriately constructed to form a single picture which corresponds to a single video frame.

The header of the video packet includes a presentation time stamp (PTS) and information such as a payload indicator which indicates the beginning of a new video frame and distinguishes video frames in the packet.

When a digital-broadcast transmitter transmits broadcast signals including video, audio and information packets in a multiplexed manner, a digital-broadcast receiver receives the broadcast signals and recovers the original video and audio signals from a desired channel to regenerate the video and corresponding audio data through a display device and a speaker.

A user can then store desired video and audio data if the digital-broadcast receiver is connected to a recording medium or if the digital-broadcast receiver is embedded in the recoding medium.

To store data, a related art recording medium generally has a PTS buffer for managing the PTS extracted from a packetized elementary stream (PES) packet and a separate buffer for storing a PTS value. Further, prior to decoding elementary stream, a method of verifying the PTS value by using the beginning of the elementary stream as a pointer is also implemented.

However, in related art methods and apparatuses for recording a transport stream, a recently-recorded portion cannot be selectively recorded in real-time, and additional processes are required to regenerate the recorded video data to prevent image interruptions.

SUMMARY OF THE INVENTION

Exemplary embodiments of the present invention overcome the above disadvantages and other disadvantages not described above. Also, the present invention may not overcome all the disadvantages described above, and an exemplary embodiment of the present invention may not overcome any of the problems described above. The present invention provides methods and apparatuses for recording transport stream, in which a packet identifier (PID) for identifying a packet, recording-location information for a packet to be recorded in a recording medium, and a reference frame serving as a basis for selective recording are used to selectively map a recording space in small amounts to record the transport stream in real-time. In addition, a recently recorded portion of the transport stream can be selectively recorded in real-time and can be regenerated without image interruptions and without requiring an additional process.

According to an aspect of the present invention, there is provided an apparatus for recording a transport stream, the apparatus including: a PID-generating module which generates a PID for a PES packet; a management module which transmits the PES packet to be stored in a predetermined recording medium depending on whether there has been any change in the PID; a controller which determines whether to record a first reference frame or a second reference frame of a video frame of the PES packet; and a packet-recording module which resets an initial recording location in the predetermined recording medium based on a result of the determination.

According to another aspect of the present invention, there is provided a method of recording a transport stream, the method including: generating a PID for a PES packet; transmitting the PES packet to be stored in a predetermined recording medium depending on whether there has been any change in the PID; determining whether to record a first reference frame or a second reference frame of a video frame of the PES packet; and resetting an initial recording location in the predetermined recording medium based on a result of the determination.

BRIEF DESCRIPTION OF THE DRAWINGS

The above and other aspects of the present invention will become apparent by describing in detail exemplary embodiments thereof with reference to the attached drawings, in which:

FIG. 2 is a diagram a buffer according to an exemplary embodiment of the present invention;

FIG. 3 is a diagram a first table according to an exemplary embodiment of the present invention;

FIG. 4 is a diagram illustrating a second table according to an exemplary embodiment of the present invention;

FIG. 5 is a diagram illustrating a third table according to an exemplary embodiment of the present invention.

DETAILED DESCRIPTION OF EXEMPLARY EMBODIMENTS OF THE INVENTION

Figure 1:
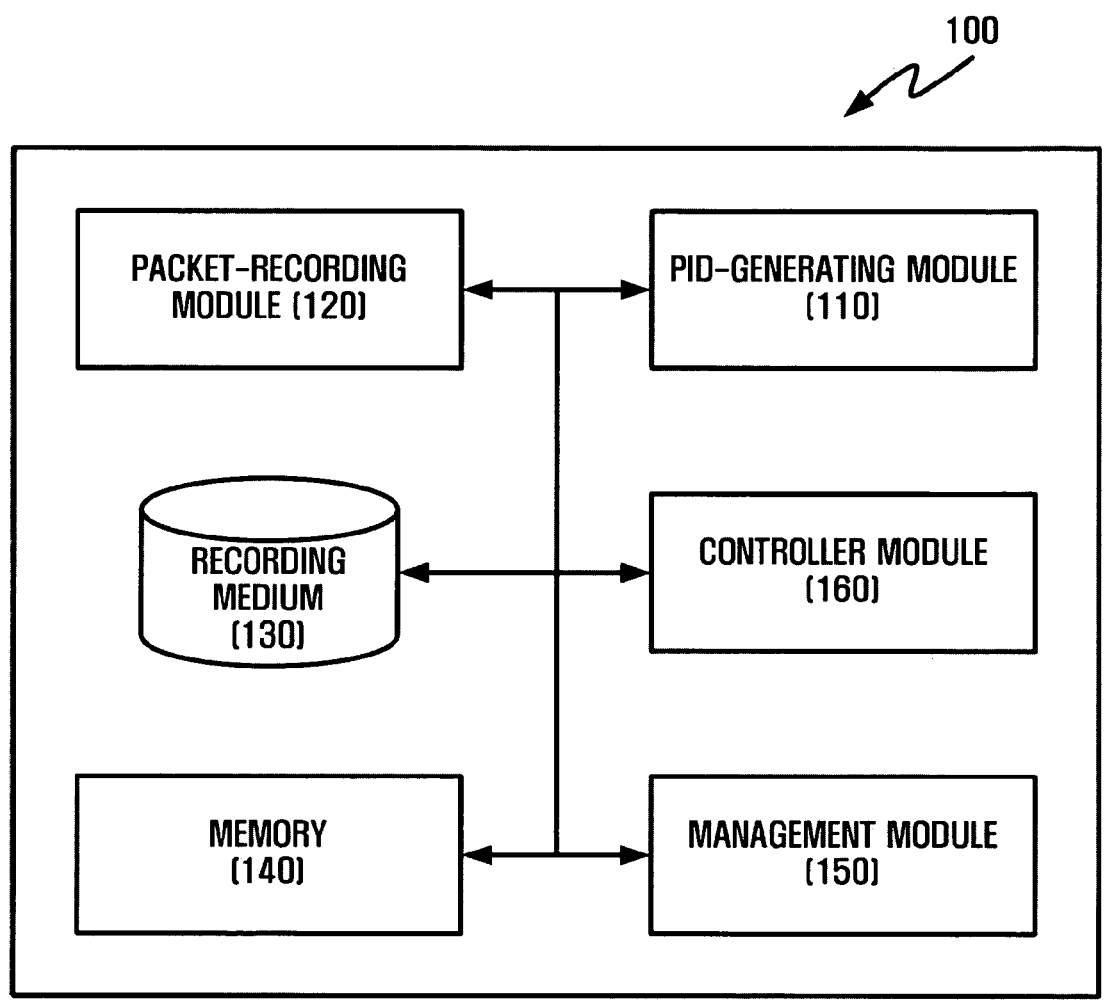
FIG. 1 is a diagram illustrating an apparatus for recording a transport stream, according to an exemplary embodiment of the present invention.

The various aspects and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the present invention to those skilled in the art, and the present invention is defined by the appended claims. Like reference numerals refer to like elements throughout the specification.

Hereinafter, exemplary embodiments of the present invention will be described in detail with reference to the accompanying drawings.

FIG. 1 is a diagram illustrating an apparatus for recording a transport stream, according to an exemplary embodiment of the present invention.

An apparatus 100 for recording a transport stream, according to an exemplary embodiment of the present invention, can be provided in a device (not shown) for regenerating a transport stream, such as a DTV, a personal computer (PC), and a portable terminal device, or can be connected to the device for regenerating a transport stream via a communication technology such as IEEE 1394, Universal Serial Bus (USB), Wi-Fi, and High Speed Downlink Packet Access (HSDPA).

As shown, the apparatus 100 includes a PID-generating module 110, a packet-recording module 120, a recording medium 130, a memory 140, a management module 150, and a controller module 160.

The apparatus 100 is not limited to the above configuration. The elements and functions provided by each component may be either combined into a smaller number of elements or components or divided into a larger number of elements or components. The apparatus 100 may be embedded in the above device for regenerating a transport stream or may be connected thereto via the above communication medium.

Although, transport stream will be described in detail with respect to an MPEG-2 transport stream in the exemplary embodiments of the present invention, the transport stream is not limited to this.

The apparatus 100 may include a tuner (not shown) which converts a transport stream received from a device (not shown) that provides an MPEG-2 transport stream, a demultiplexer which provides separates video and audio PES packets, and a decoder which decodes a PES packet by a predetermined method to regenerate the PES packet. These components are generally included in related art devices for regenerating transport streams, and thus their description has been omitted.

First, the PID-generating module 110 generates PIDs corresponding to a plurality of PES packets transmitted from the tuner.

The PID-generating module 110 generates unique information for identifying the plurality of PES packets by using at least one or more of letters, numbers, or a combination of letters and numbers. This is a preliminary process performed for a real-time selective recording.

Although, the PID-generating module 110 generates the PIDs for the PES packets on its own, the PTS from the header of a PES packet or index information for distinguishing frames can be analyzed and extracted to generate the PIDs. Here, the index information is transmitted along with a payload indicator that indicates the beginning of each frame.

The packet-recording module 120 stores the PES packets corresponding to the generated PIDs in a buffer 200. Referring to FIG. 2, recording-location information for the PES packets stored in the buffer 200 is transmitted to the management module 150.

The recording medium 130 may be one that can be used in a related art recording apparatus, such as a compact disc (CD), a digital versatile disc (DVD), an hard disk drive (HDD), an SSD or a holography memory. When provided with a communication module (not shown) for a web service, the recording medium 130 can be used as a web storage.

The memory 140 may be a volatile memory or a nonvolatile memory which stores at least one of a first table 300, a second table 400, and a third table 500.

The buffer 200 and the memory 140 are configured separate from each other, and are managed by the management module 150 (described later).

The management module 150 which manages the memory 140 will be described in detail by referring to FIGS. 2, 3 and 4.

First, the buffer 200 shown in FIG. 2 stores the plurality of PES packets corresponding to the PIDs.

Here, the management module 150 determines whether there has been any change in the PIDs. If there is a changed PID, the management module 150 provides the result of the determination to the packet-recording module 120 to record PES packets corresponding to the changed PID in the recording medium 130.

Further, the management module 150 determines recording-location information of the PES packets corresponding to the PIDs recorded in the recording medium 130, and provides the recording-location information and corresponding PIDs to the packet-recording module 120 to be recorded in the first table 300.

That is, the table 300 records the PIDs and the recording-location information of the PES packets stored in the recording medium 130, if there is a changed PID.

At this time, the recording-location information and the PIDs stored in the buffer 200 are reset by the management module 150.

The controller module 160 performs the overall control of the apparatus 100 for recording a transport stream. The controller module 160 determines according to settings the validity of a selective recording section being recorded with a video stream, and sends a signal corresponding to the determination to the management module 150.

The selective recording section settings in the controller module 160 are set according to user settings (for example, start or end recording command input through an input device (not shown) such as a remote control), setting changes in a reference frame, and setting changes in decoding event.

A predetermined signal sent to the management module 150 is generated based on a recording determination (record, continue recording, and stop recording) for a reference frame of a video stream decoded by the decoder.

The controller module 160 records an identifier number for the reference frame, a PID corresponding to the reference frame, and recording information in Table 3 to be stored in the memory 140.

Here, the recording information may include information on whether it is valid or invalid to record. The reference frame may be a reference frame at the beginning of recording (hereinafter referred to as "first reference frame) or a reference frame of a decoded video stream which is used to make a recording determination (hereinafter referred to as "second reference frame). However, the second reference frame according to the exemplary embodiments of the present invention can be the first reference frame when the second reference frame is used as a reference frame located at the beginning of selective recording.

An identifier number for the first reference frame located at the beginning of selective recording initiated by the selective recording section settings, a PID corresponding to the first reference frame, and recording information are stored in the third table 500.

As described above, since the second reference frame can be also used as a reference frame located at the beginning of selective recording, the identifier number for the first reference frame is used to distinguish the first reference frame from the second reference frame.

Based on the second reference frame, the controller module 160 determines a recording region, and sends a valid or invalid recording signal corresponding to the determination to the management module 150.

If the valid recording signal is sent, a PID for the second reference frame is also sent along with the valid recording signal at least once.

When the management module 150 receives the valid recording signal and the PID for the second reference frame, the management module 150 extracts recording-location information corresponding to the PID of the second reference frame from the first table 300, and records the information in the second table 400.

In addition to the PIDs and recording-location information, recording information of the second reference frame can also be stored in the table 400. Here, the recording information may be about whether to continue recording a corresponding reference frame.

In contrast, if the invalid recording signal is sent, a PID for the first reference frame is also sent along with the invalid recording signal to the management module 150.

The management module 150 extracts the identical PID for the first reference frame from the second table 400, and sends recording-location information of a corresponding PID to the packet-recording module 120.

The packet-recording module 120 receives the recording-location information 420 of the first reference frame, and resets an initial recoding location in the recording medium 130.

When the initial recording location is reset, the recording medium 130 records the PES packets based on the initial recording location, and sends recording-location information to the management module 150 to be recorded in the first table 300.

Figure 6:
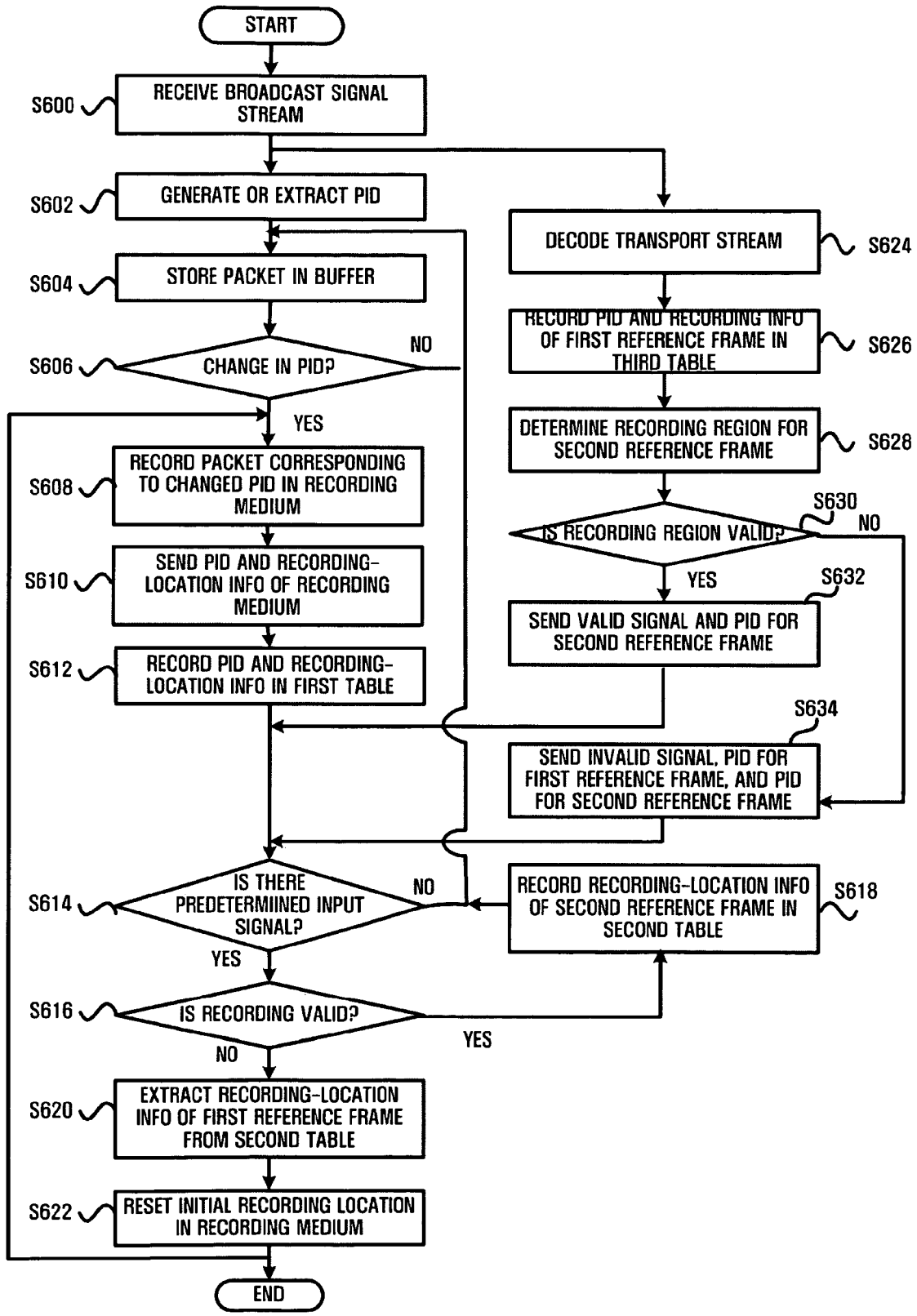
FIG. 6 is a flowchart illustrating recording of a transport stream, according to an exemplary embodiment of the present invention.

FIG. 6 is a flowchart illustrating a recording of a transport stream, according to an exemplary embodiment of the present invention.

The recording of the transport stream illustrated in FIG. 6, according an exemplary embodiment of the present invention, shows recording of the transport stream by the apparatus 100, which makes it possible to realize selective recording as described in FIG. 1.

First, when a broadcast-signal stream is received from a predetermined device (not shown; operation S600), the PID-generating module 110 generates or extracts PIDs corresponding to a plurality of PES packets in the broadcast-signal stream (operation S602).

According to a generating method of the PID-generating module 110, a PTS or index information can be used as a PID by being extracted from the broadcast-signal stream (MPEG-2) and analyzed, and a unique identifier code (a letter or a number) corresponding to each packet can be assigned to be used as a PID.

The above information is sent to a decoder provided in either the apparatus 100 for recording a transport stream or an apparatus (not shown) for generating a transport stream. Here, the apparatus 100 can be connected to the apparatus for generating a transport stream, or can be incorporated therein.

When the PIDs corresponding to the plurality of PES packets are extracted or generated, the PID recording module 120 stores the plurality of PES packets in the buffer 200 (operation S604).

When the PES packets are stored in the buffer 200, the management module 150 determines whether there has been any change in the PIDs stored in the buffer 200 (operation S606).

If it is determined that there has been no change in the PIDs, PES packets having the same PIDs and different recoding-location information are stored in the buffer 200 (operation S604). In contrast, if it is determined that there has been any change in the PIDs, PES packets stored in the buffer 200 by the changed PIDs is sent to the packet-recording module 120 to be recorded in the recording medium 130 (operation S608).

At this time, recording-location information, which corresponds to the PES packets, in the recording medium 130, and the PIDs are sent to the management module 150 (operation S610).

After being received by the management module 150, the recording-location information and the PIDs are recorded in the first table 300 by the packet-recording module 120 (operation S612).

When the recording-location information and the PIDs are recorded in the first table 300, the management module 150 determines whether there exists an input signal (a valid or invalid signal) sent from the controller module 160 (operation S614).

Here, the input signal is sent from the controller module 160 according to the selective recording settings described in FIG. 1, thus description thereof will be omitted.

When the transport stream is decoded (operation S624), the controller module 160 records in the third table 500 recording information, a PID corresponding to the first reference frame, and the first reference frame which has started to be recorded by at least one from user settings, change in reference frame settings and change in decoding event settings (operation S626). At this time, if the second reference frame and PIDs are sent to the controller module 160, the controller module 160 determines the recording region for the second reference frame (operation S628).

The determination of the recording region is based on at least one of user settings, a change in reference frame settings, and a change in decoding event settings to determine whether to continue to record the second reference frame.

If it is determined to continue to record the second frame, the validity of the recording region of the second reference frame is determined (operation S630). A valid or invalid signal corresponding to the result of the determination on whether to continue to record the second reference frame is sent to the management module 150.

If the controller module 160 determines the recording region of the second frame is valid, the valid signal and the PID for the second reference frame are sent to the management module 150 (operation S632).

In contrast, if the recoding region of the second reference frame is determined to be invalid, the invalid signal, the PID for the second reference frame and the PID for the first reference frame are sent to the management module 150 (operation S634).

The management module 150 determines whether there exists a predetermined signal sent from the controller module 160 (operation S614). Here, the signal may be either a valid or invalid signal.

Then, the management module 150 determines whether recording based on the signal is valid (operation S616).

If the signal (valid signal) is determined to be valid, the management module 150 extracts from the first table 300 recording-location information corresponding to the PID for the second reference frame, and records the information in the second table 400 (operation S618). PIDs, recording-location information, and recording information can be recorded in the second table 400. The recording information in the second table 400 may be information to start recording, or information on the validity of the recording.

When the above information is recorded in the second table 400, the PES packets are fed back to the storing operation S604.

If the invalid signal is sent from the controller module 160, recording-location information corresponding to the PID for the first reference frame is extracted from the second table 400 (operation S620), and the packet-recording module 120 resets the initial recording location in the recording medium 130 based on the extracted recording-location information (operation S622).

When the initial recording location is reset, the packet-recording module 120 records the PES packets on the reset initial recording location in the recording medium 130. The PIDs and recording-location information of the PES packets are sent to the management module 150 to be recorded in the first table 300.

As described above, methods and apparatuses of the exemplary embodiments of the present invention may provide the following advantages.

Since the start and end of recording are based on a reference frame, a recorded video can be regenerated without image interruptions.

Additionally, since video packets are stored by being edited based on a reference frame, in the event the storing of a video stream is interrupted, the video streams can resume the storing process without image interruptions.

Further, since the PID for the first or second reference frame, the recording-location information of a recording module, and the PID for a transport stream can be mapped, a selective recording in real-time can be provided by using the PID for a video stream to be recorded or deleted.

While the present invention has been particularly shown and described with reference to exemplary embodiments thereof, it will be understood by those of ordinary skill in the art that various changes in form and detail may be made therein without departing from the spirit and scope of the present invention as defined by the following claims. The exemplary embodiments should be considered in descriptive sense only and not for purposes of limitation.

What is claimed is:

1. An apparatus for recording transport stream, the apparatus comprising:
a packet identifier (PID)-generating module which generates a PID for a packetized elementary stream (PES) packet;
a management module which transmits the PES packet to be stored in a recording medium depending on whether there has been a change in the PID;
a controller module which determines whether to record a first reference frame or a second reference frame of a video frame of the PES packet based on at least one of a user setting, a change in a reference-frame setting, and a change in a decoding-event setting;
a packet-recording module which resets an initial recording location in the recording medium based on a result of the determination by the controller module; and
a memory in which at least one of a first table, a second table, and a third table are stored,
wherein the first table comprises a record with the PID and recording-location information of the recording medium, according to the change in the PID,
the second table comprises recording-location information corresponding to a PID for the second reference frame, the recording-location information having been extracted from the first table, and
the third table comprises the first reference frame, recording information, and a PID for the first reference frame.

2. The apparatus of claim 1, further comprising a buffer in which the PES packet and another PES packet are recorded at an initial recording location.

3. The apparatus of claim 1, wherein the first table and the second table are updated according to a valid recording signal or an invalid recording signal output from by the controller module based on the determination by the controller module.

4. The apparatus of claim 3, wherein the valid recording signal comprises the PID for the second reference frame, and in response to the valid recording signal, the management module records the recording-location information for the second reference frame in the second table.

5. The apparatus of claim 3, wherein the invalid recording signal comprises the PID for the first reference frame and the PID for the second reference frame, and in response to invalid recording signal, the management module extracts the recording-location information for the first reference frame from the second table, and resets the initial recording location in the recording medium.

6. A method of recording a transport stream, the comprising:
generating a packet identifier (PID) for a packetized elementary stream (PES) packet through a PID-generating module;
transmitting the PES packet to be stored in a recording medium depending on whether there has been a change in the PID through a management module;
determining whether to record a first reference frame or a second reference frame of a video frame of the PES packet through a controller module based on at least one of a user setting, a change in a reference-frame setting, and a change in a decoding-event setting;
resetting an initial recording location in the recording medium based on a result of the determining through a packet recording module;
wherein the method further comprises at least one of:
recording in a first table the PID and recording-location information of the recording medium, according to the change in the PID;
recording in a second table recording-location information corresponding to a PID for the second reference frame, the recording-location information having been extracted from the first table; and
recording in a third table the first reference frame, recording information, and a PID for the first reference frame.

7. The method of claim 6, further comprising recording the PES packet and another PES packet at an initial recording location.

8. The method of claim 6, wherein the first table and the second table are updated according to a valid recording signal or an invalid recording signal resulting from the determining.

9. The method of claim 6, wherein the valid recording signal resulting from the determining comprises the PID for the second reference frame, and records the recording-location information for the second reference frame in the second table.

10. The method of claim 6, wherein the invalid recording signal resulting from the determining comprises the PID for the first reference frame and the PID for the second reference frame, and the method further comprises extracting the recording-location information for the first reference frame from the second table, and resetting the initial recording location in the recording medium.

* * * * *